T. Ahrens,
Faucet.
No. 106,020.    Patented Aug. 2, 1870.
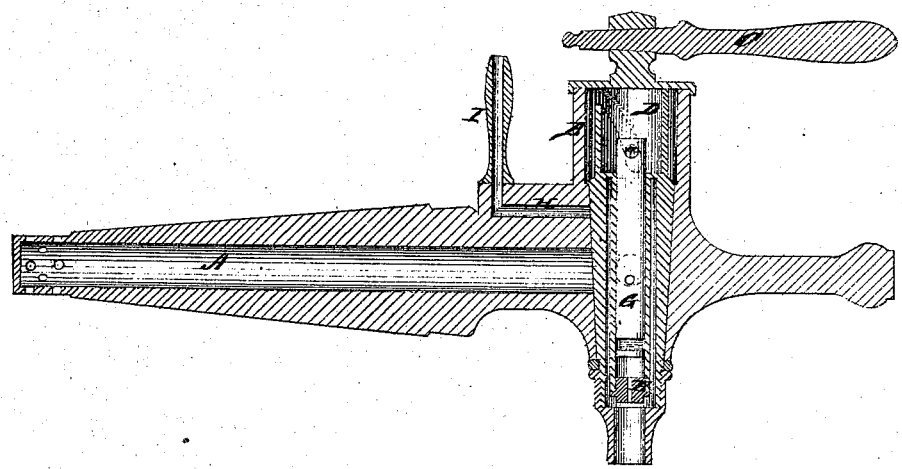
Witnesses
Jno. A. Ellis
J. C. White
Inventor
Theodore Ahrens
Per
T. G. Alexander
Atty

United States Patent Office.

THEODORE AHRENS, OF LOUISVILLE, KENTUCKY.

Letters Patent No. 106,020, dated August 2, 1870.

IMPROVEMENT IN BEER-FAUCETS.

The Schedule referred to in these Letters Patent and making part of the same

*To all whom it may concern:*

Be it known that I, THEODORE AHRENS, of Louisville, in the county of Jefferson and State of Kentucky, have invented certain new and useful Improvements in Beer-Faucets; and I do hereby declare that the following is a full, clear, and exact description thereof, reference being had to the accompanying drawings and to the letters of reference marked thereon, which form a part of this specification.

The nature of my invention consists in the construction and arrangement of a beer-faucet, as will be hereinafter fully set forth.

In order to enable others skilled in the art to which my invention appertains to make and use the same, I will now proceed to describe its construction and operation, referring to the annexed drawings, which represent a longitudinal vertical section of my faucet.

A represents the main tube, provided with a strainer on the inner end, to be inserted in the beer-barrel.

In the outer end is the usual cylinder B, provided with an aperture and a lever, C, for turning the beer off or on at will.

Inside of the cylinder B is a tube, D, leaving a space or chamber between its outer side and the inner side of the cylinder, for the beer to flow through.

This tube is provided with a small aperture, facing the lower edge of the aperture in the cylinder, and its lower end is provided with a nut, E, having a fine hole through its center.

Inside of the tube D is a valve and valve-stem, G, which is moved up and down by the turning of the lever C in the following manner:

In the upper end of the valve-stem G is a pin, *a*, which projects through a spiral slot in the tube D, and enters a spiral groove in that portion of the cylinder B of the faucet through which the cylinder passes, so that thus, by the turning of the lever C and tube D, the valve-stem is moved up and down.

The faucet is so arranged that it requires but a quarter-turn of the lever to make the beer flow and squirt.

By turning the faucet on, the beer flows between the tube D and cylinder B; by turning it off, the beer in the tube D is squirted out by the valve G, through hole in the nut E, which produces the foam or steam, as it is called.

In the main body A of the faucet is an air-passage, H, having an upright conductor, I, which, by a rubber or other flexible tube, is connected with the bung.

This air-passage is so constructed as to be closed when the faucet is turned off, but open when the faucet is turned on, so as to conduct air into the barrel while the beer is flowing, and that just enough to fill the vacuum caused by the outflow, the benefit of which is that it keeps the properties of the beer condensed in their proper limits, so that the last glass let out is as good as the first.

Having thus fully described my invention,

What I claim as new, and desire to secure by Letters Patent, is—

The combination of the cylinder B, tube D, nut E, valve-stem G, and pin *a*, all constructed and arranged to operate substantially as and for the purposes herein set forth.

In testimony that I claim the foregoing as my own, I affix my signature in presence of two witnesses.

T. AHRENS.

Witnesses:
L. KOSIOL,
MORRIS OPPENHEIMER.